(12) United States Patent
Lancaster

(10) Patent No.: US 6,625,722 B1
(45) Date of Patent: Sep. 23, 2003

(54) PROCESSOR CONTROLLER FOR ACCELERATING INSTRUCTION ISSUING RATE

(75) Inventor: John C Lancaster, Chartridge (GB)

(73) Assignee: Aspex Technology Limited (GB)

( * ) Notice: Subject to any disclaimer, the term of this patent is extended or adjusted under 35 U.S.C. 154(b) by 0 days.

(21) Appl. No.: 09/423,917

(22) PCT Filed: May 21, 1998

(86) PCT No.: PCT/GB98/01461

§ 371 (c)(1),
(2), (4) Date: Nov. 16, 1999

(87) PCT Pub. No.: WO98/53408

PCT Pub. Date: Nov. 26, 1998

(30) Foreign Application Priority Data

May 23, 1997 (GB) .............................................. 9710749

(51) Int. Cl.[7] .............................................. G06F 15/80
(52) U.S. Cl. .............................. 712/16; 712/10; 712/11; 712/22; 712/214; 712/215; 712/241; 712/208
(58) Field of Search .............................. 712/10, 11, 16, 712/22, 214, 215, 241

(56) References Cited

U.S. PATENT DOCUMENTS

| 4,807,115 A | 2/1989 | Torng |
| 5,303,356 A | 4/1994 | Vassiliadis et al. |
| 5,475,824 A | 12/1995 | Grochowski et al. |
| 5,511,212 A | * 4/1996 | Rockoff ........................ 712/22 |
| 5,524,223 A | 6/1996 | Lazaravich et al. |
| 5,649,135 A | * 7/1997 | Pechanek et al. ............ 712/200 |
| 5,682,520 A | * 10/1997 | Fang et al. .................. 345/502 |
| 5,709,209 A | * 1/1998 | Friemel et al. .............. 600/447 |
| 5,819,058 A | * 10/1998 | Miller et al. ................. 712/210 |

FOREIGN PATENT DOCUMENTS

GB  2 284 492  6/1995

* cited by examiner

Primary Examiner—William M. Treat
(74) Attorney, Agent, or Firm—Killworth, Gottman, Hagan & Schaeff LLP

(57) ABSTRACT

A data processor controller comprising a first processor for generating data processor instructions at a first rate and an instruction multiplying circuit for receiving the data processor instructions at the first rate and being a arranged to multiply the instructions and forward the multiplied instructions to a data processor at a second rate substantially greater than the first rate is disclosed. The first processor outputs a stream of compounded data processor instructions and the multiplying circuit separates the compounded instructions into a single stream of individual instructions in a non-compounded format. Multiplication is effectively achieved by repeating both single and blocks of data processor instructions. The effective bandwidth between the first processor and the data processor is multiplied by the multiplying circuit which takes advantage of the different sizes of data pathways available between the first processor and the data processor.

55 Claims, 7 Drawing Sheets

Instruction Generation Bandwidth Multiplier Block Diagram

Figure 1. Standalone Case
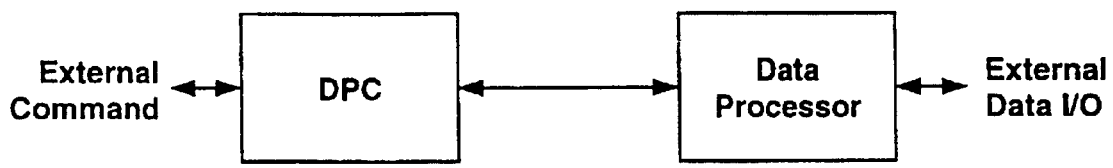
Figure 2. Co-processor Case
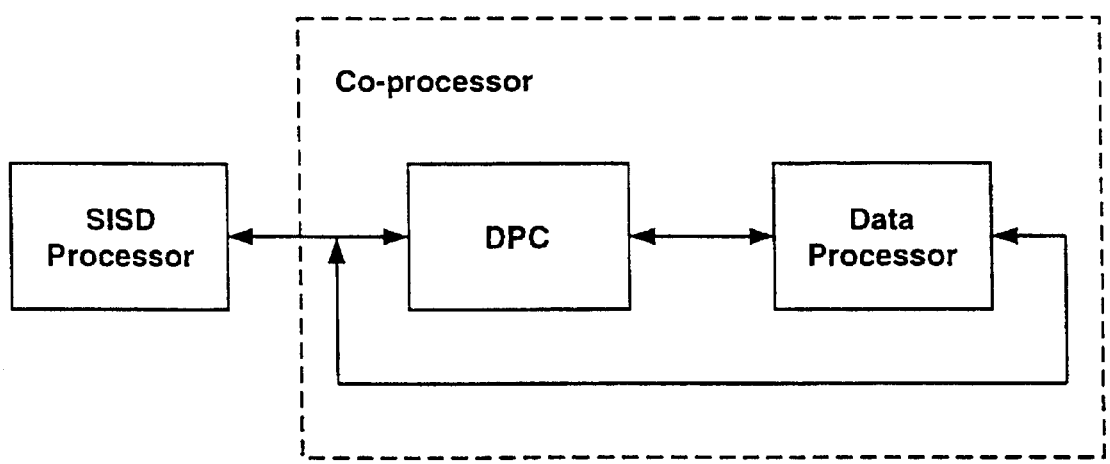
Figure 3. Direct Microprocessor Drive DPC
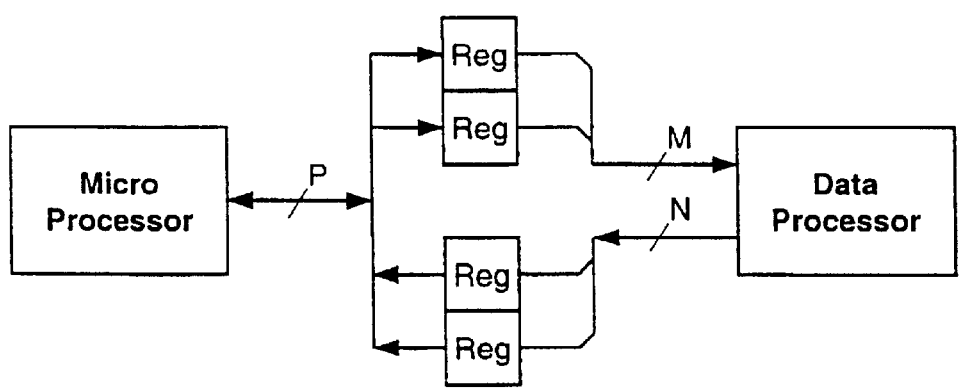

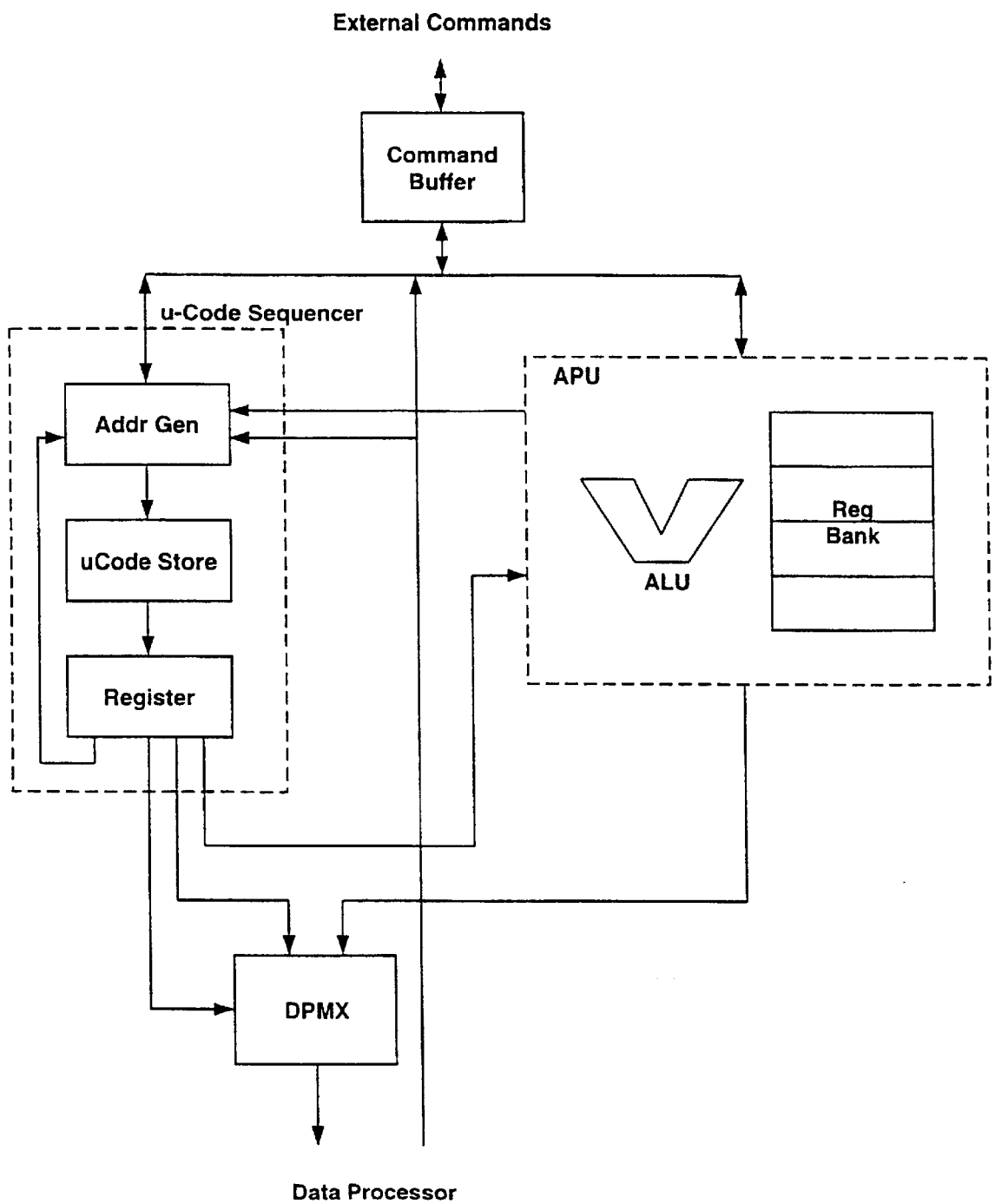
Figure 4. Custom Micro-Code Sequencer DPC

Figure 5. The New DPC Architecture
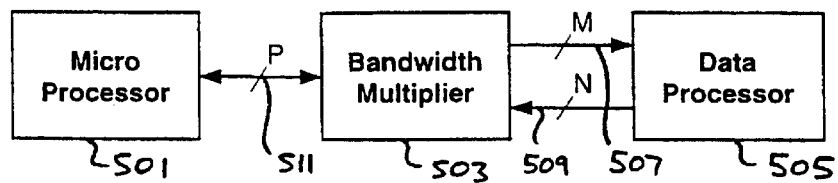
Figure 6. Instruction Generation Bandwidth Multiplier Block Diagram
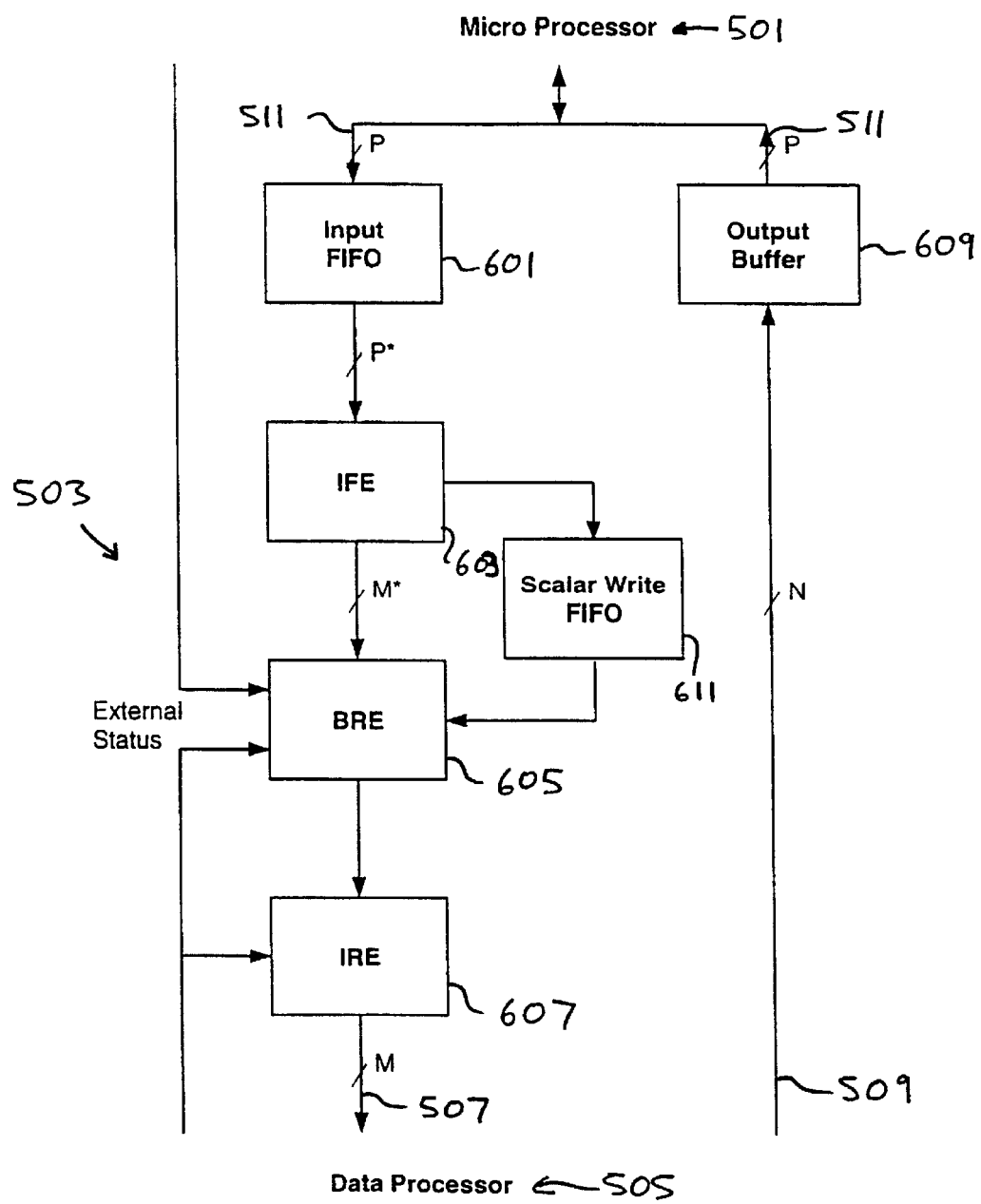

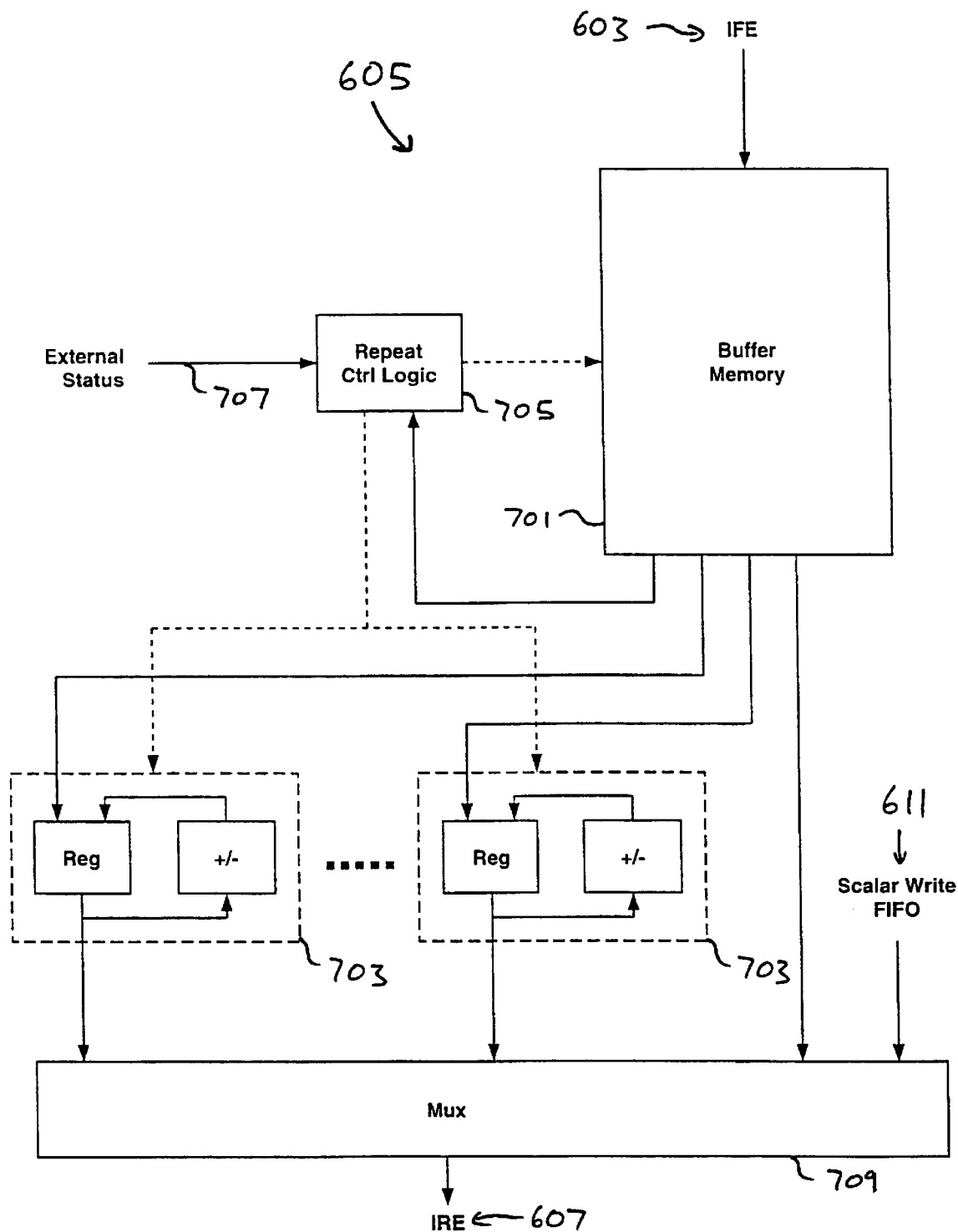
Figure 7. BRE Block Diagram

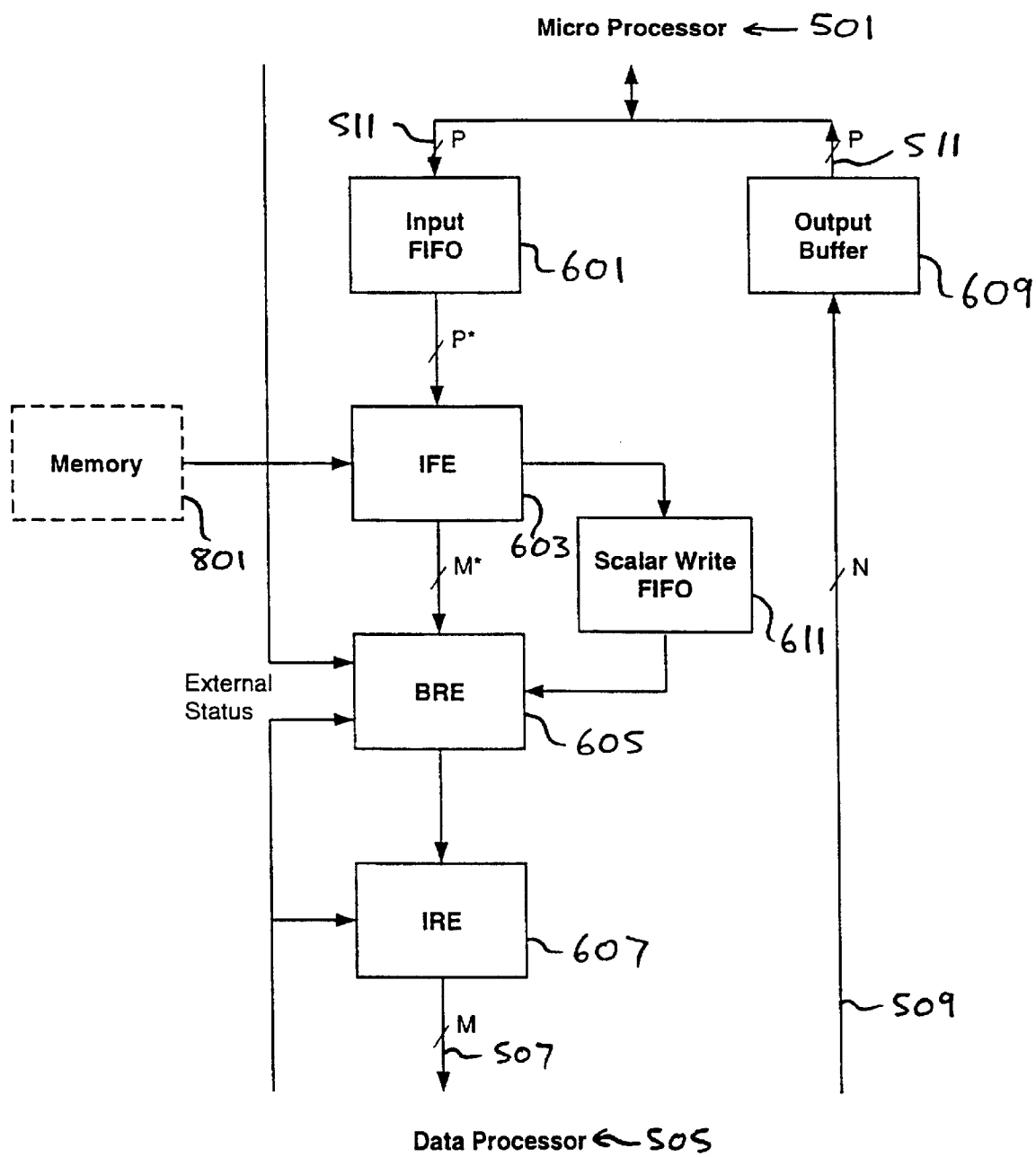
Figure 8. Extended Bandwidth Multiplier Block Diagram

Figure 9. Architecture of a Micro-LAC DPC
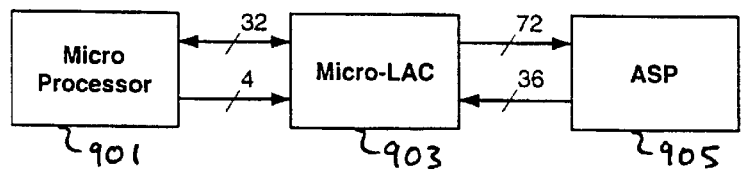
Figure 10. Micro-LAC Block Diagram
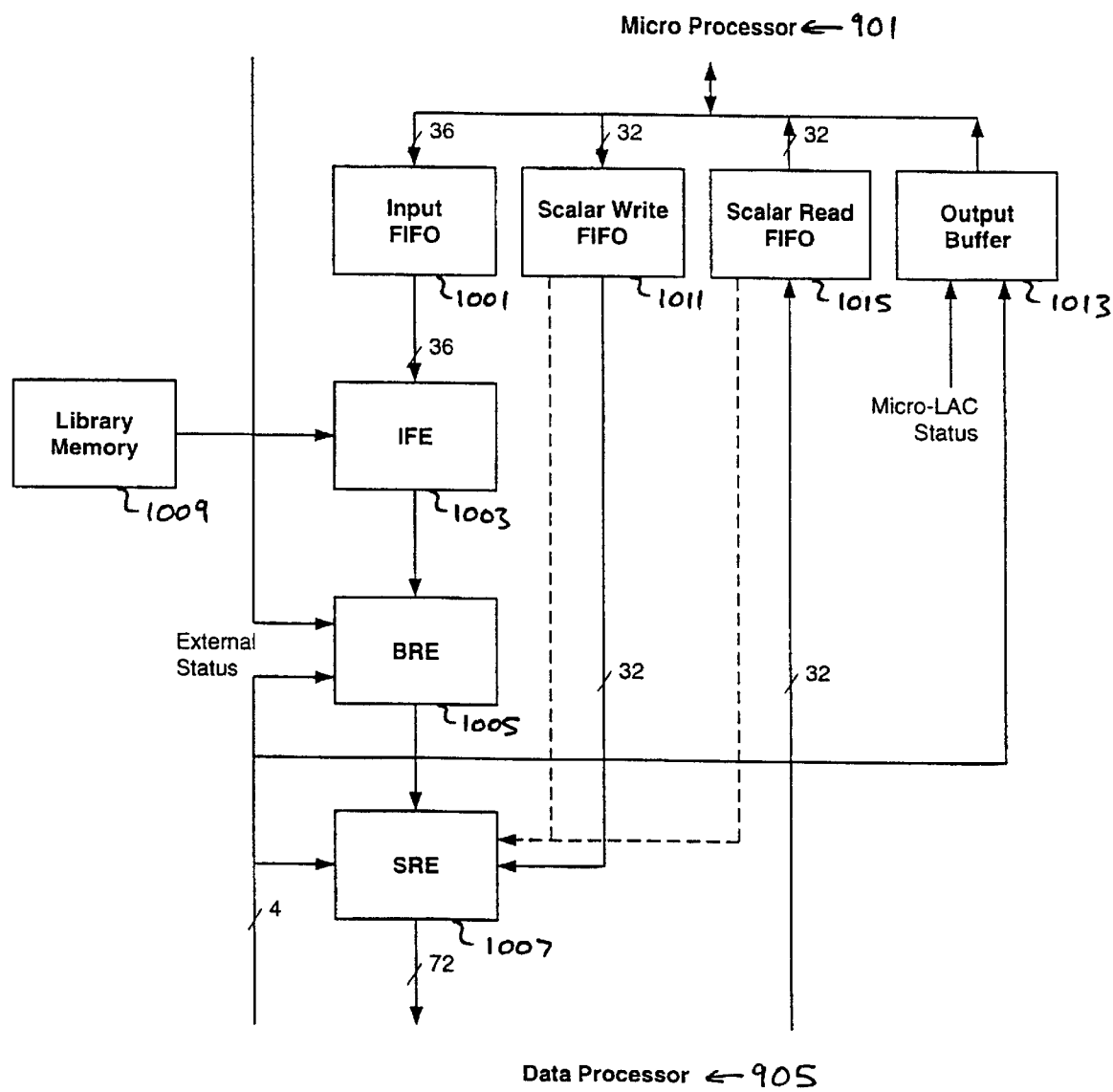

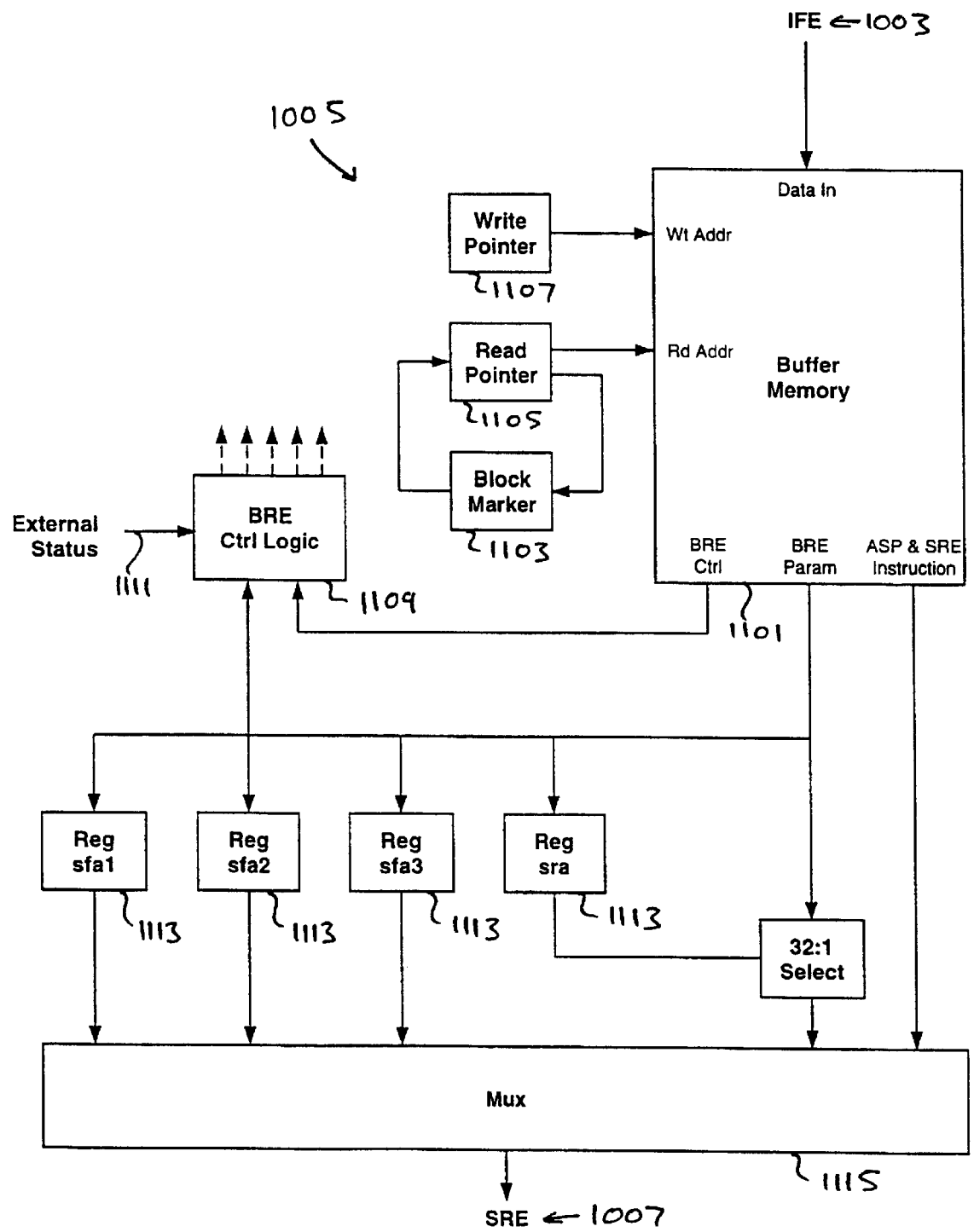
Figure 11. Micro-LAC BRE Block Diagram

PROCESSOR CONTROLLER FOR ACCELERATING INSTRUCTION ISSUING RATE

This invention broadly relates to parallel processing in the field of computer technology, and more particularly concerns systems, devices and methods for generating instructions for a parallel computer such as a Single Instruction Multiple Data (SIMD) data processor.

Parallel processing is increasingly used to meet the computing demands of the most challenging scientific and engineering problems, since the computing performance required by such problems is usually several orders of magnitude higher than that delivered by general-purpose serial computers. Growth in parallel processing has opened up a broad spectrum of application areas including image processing, artificial neural networks, weather forecasting, and nuclear reactor calculations.

Whilst different parallel computer architectures support differing modes of operation, in very general terms, the core elements of a parallel processor include a network of processing elements (PEs) each having one or more data memories and operand registers, with each of the PEs being interconnected through an interconnection network (IN).

One of the most extensively researched approaches to parallel processing concerns Array Processors, which are commonly embodied in single instruction stream operating on multiple data stream processors (known as Single Instruction Multiple Data or SIMD processors). The basic processing units of an SIMD processor are an array of processing elements (PEs), memory elements (M), a control unit (CU), and an interconnection network (IN). In operation, the CU fetches and decodes a sequence of instructions from a program, then synchronises all the PEs by broadcasting control signals to them. In turn, the PEs, operating under the control of a common instruction stream, simultaneously execute the same instructions but on the different data that each fetches from its own memory. The interconnection network facilitates data communication among processing units and memory. Thus the key to parallelism in SIMD processors is that one instruction operates on several operands simultaneously rather than on a single one.

In a standard set-up, an SIMD processor is attached to a host computer, which, from the user's point of view, is a front-end system. The role of the host computer is to perform compilation, load programs, perform input/output (I/O) operations, and execute other operating system functions.

An example of an SIMD processor which is made and sold by the Applicant, the Aspex™ ASP™ (Associative String Processor) data processor, can in typical configurations operate on 1000 to 100,000 data items in parallel. The major features of current implementations of the ASP are:

256 processing elements on a single device 8.1 mm×9.3 mm in size to 1152 processing elements on a single device 14.5 mm×13.5 mm in size.
  DPC interface 80–82 bits wide operating at 20M–50M instructions per second (20–50 MIPS).
  40–100MHz clock speed.

An ASP that has been implemented is controlled by a 76-bit wide instruction consisting of 32-bit Control, 32-bit Data and 12-bit Activity fields. The ASP performs two (sequentially executed) operations for every instruction received. To support this, the control field is further subdivided into the sub-instruction fields A and B. Data I/O to the ASP uses high-speed channels, but it also can return a 32-bit wide value to a control unit, and has four status lines that can be monitored by a control unit.

The ASP can perform operations on data in the APE in bit serial (one bit at a time) or bit parallel (many bits at a time). Operations are classed as Scalar-Vector when one operand is the same value on all APEs or Vector-Vector for all other cases. Vector-Vector operations require the control unit to supply the operand addresses in the instruction and are normally performed bit serial. Scalar-Vector operations require the control unit to supply the common, i.e. scalar, operand's value and the address of the second operand in the instruction and are performed bit serial or parallel. Both cases require that the address of the result is also included in the instruction.

For the purposes of controlling an SIMD processor, the range of architectures can be considered to be bounded by two basic cases: standalone and co-processor. Other architectures are either variations, a blend or multiple instances of the two basic cases. A control unit common to standalone, co-processor and intermediary architectures is a Data Processor Controller (DPC). As will become apparent, a DPC executes the control statements of a program and issues instructions to the SIMD processor.

The standalone arrangement which is shown in FIG. 1 of the accompanying drawings consists of two blocks: the SIMD processor which manipulates data, and the DPC which issues instructions to the SIMD processor and thereby controls the operation of the SIMD processor. A characteristic of the standalone case is that data I/O is direct to the SIMD processor. Optional external commands and status checks go to and from the DPC.

The co-processor arrangement which is shown in FIG. 2 consists of a SIMD processor coupled via a DPC to a more conventional processor embodied in a single instruction stream operating on single data stream processor (also known as a Single Instruction Single Data or SISD processor). The combination of the DPC and the SIMD processor can be regarded as a co-processor to the SISD processor.

SISD processors can range in complexity from a processor core like the ARM, through microprocessors like the Intel Pentium or the Sun SPARC, up to complete machines like an IBM/Apple PC or a Sun/DEC workstation (all trade marks acknowledged).

During the execution by an SISD of a given program, the organisation of the system is such that the SISD delegates certain tasks along with their parameters to the co-processor. The division of this task between the DPC and the SIMD processor is the same as for the standalone case. While the co-processor is performing its assigned task, the SISD processor continues executing the program; the overall result being that the program steps are completed faster than if the SISD processor alone had been relied upon to execute the program. For example, in an image processing application, a program contains a statement which divides all the pixels in an image by the value X, the SISD processor will assign this statement and the value X to the co-processor for execution. Similarly if, say, another part of the program performs a two dimension convolution on the image, this task would also be assigned to the co-processor for execution.

Notably, the major attributes of a DPC are:
  Supply instructions to the SIMD processor at a very high rate, typically 20–100M instructions per second.
  Generate wide instructions, typically a couple of hundred bits.
  Process status information from the data processor.

At present, known DPCs fall into one of two general categories: (i) direct microprocessor drive and (ii) custom micro-code sequencer.

Direct microprocessor drive provides a versatile and simple DPC solution employing software running on a stored-program microprocessor or digital signal processor (DSP) device to generate and assemble the data processor instructions. FIG. 3 shows such a solution. The SIMD processor's M-bit wide instruction and N-bit wide status/result interfaces are connected via registers to a P-bit wide interface to the address/data bus or I/O channel of the microprocessor/DSP, and in general, M and/or N will be larger than P. In use, the software program builds each data processor instruction by writing it P bits at a time and once all M bits have been written, the instruction is issued. Similarly, the N-bit status/result data is read in segments.

The versatility of the direct microprocessor drive approach comes from the direct generation of the data processor instructions by the microprocessor/DSP. However, its main disadvantage is the poor instruction generation speed caused by the need to write a number of P-bit words to generate each M-bit instruction, and the relatively poor write speed of even the latest microprocessor/DSP. Consequently, the rate at which the DPC operates lags behind the rate at which the SIMD processor can operate; processing capacity of the SIMD processor therefore remains untapped.

Turning to custom micro-code sequencer DPCs, these use a custom micro-code sequencer or bit-slice sequencer architecture micro-coded with a complete application or with a library of micro-routines that perform simple tasks which can be assembled to build an application. The micro-code is normally hardwired or down-loaded before an application is run, but some DPCs have schemes for changing the micro-code while the application is running.

FIG. 4 shows a simplified micro-code sequencer DPC solution. It consists of four blocks: 1) micro-code sequencer, 2) arithmetic processor unit (APU), 3) data processor instruction multiplexer (DPMX) and 4) command buffer. Taking each unit in turn:

1) The micro-code sequencer controls the DPC in the sense that it generates the base data processor instructions. The sequencer contains a very wide high-speed memory that holds the micro-code which is addressed by the address generation unit and its output is registered, then divided into micro-order fields that control the sequencer's address generation unit and the other DPC blocks, or contain the data processor instruction. The address generation unit has dedicated logic for performing calls, branches and deterministic and non-deterministic loops. It has test inputs that allow it to make decisions based on the state of the DPC or the SIMD processor and has a data input for loading a branch address or a loop count.

2) The APU performs general arithmetic. It can be loaded with parameters from the command buffer, results from the SIMD processor or literals from the micro-code sequencer. The result is used to control the sequencer or parameterise the data processor instructions. Often the APU supports generation of the operand/result address fields of a data processor instruction and manipulation of the scalar value when the data processor is performing a scalar-vector operation. In practice a DPC will have a number of APUs with private data paths each dedicated to a particular function or groups of functions. For instance, a typical micro-code sequencer DPC may have four to six APUs dedicated to specific functions and a 200-bit wide micro-code store built from very fast random access static memory.

3) The DPMX parameterises the base data processor instruction produced by the micro-code sequencer, replacing parts of the instruction with values taken from APU registers.

4) The command buffer provides a means for external control of the DPC: task requests along with their parameters are taken from the buffer and results and status information is placed into the buffer. The buffer may be implemented as a simple register, small memory or first in first out (FIFO) memory. In the standalone case, a command buffer is optional.

An example of a DPC with custom micro-code sequencer architecture is the Aspex™ Microsystems LAC-1001™ card. This card generates a 80-bit data processor instruction every 50 nS. It is 340 mm by 367 mm in size and has a power consumption of 12 Amps at 5 Volts.

The principle advantage of the custom micro-code sequencer is its speed of operation. However, this is offset by its lack of flexibility and circuit complexity. Such a DPC solution can only perform tasks it has been micro-coded to do; also the flexibility of the micro-code is restricted by the functions and data paths provided in the hardware which renders it application-specific and limits its usefulness. Additionally, the complexity of the circuit results in a DPC that suffers the drawbacks of being large, expensive and having a high power consumption.

The disadvantages arising in particular from the complexity of the circuit have numerous undesirable knock-on effects. Initially, the circuit design has to be elaborate, then the extensive number of components have to be manufactured, assembled, coded and tested. Inevitably, the circuit is relatively large (typically around 1250 $cm^2$) and therefore requires 'big box' custom equipment which is not suitable for PC based or OEM implementation. Reliability is a further important issue; with complex multi-component circuitry this is constantly a problem.

All of these factors clearly add to cost, which drastically limits the accessibility of the technology. For example, the current cost a 3D medical imaging system ranges between £1M to £10M, and yet still fails to meet ideal real-time performance standards.

Against this background, the present invention seeks to provide a DPC which achieves the performance of the custom micro-code sequencer approach and the flexibility of the direct microprocessor drive approach in a size and at a cost of near that of the direct drive solution.

To this end, the invention feeds data processor instructions generated at a low rate to a circuit that generates the data processor instructions at a high rate, i.e. increases the instruction generation bandwidth. The term "rate" means the number of instructions generated in a given period of time, and the term "instruction generation bandwidth" means the number of instruction bits generated in a given period of time.

The invention may be applied to both standalone cases and co-processor cases. In standalone cases, a DPC executes control statements of a program containing data processor instructions, multiplies the data processor instructions and issues the multiplied data processor instructions to the data processor which manipulates the data. The rate of the generation of the multiplied data processor instructions is greater than the rate of the execution of the statements of the program.

In co-processor cases, an SISD processor executes a program and farms out some tasks to a co-processor comprising a DPC and a data processor. The DPC multiplies data processor instructions and issues them to the data processor at a rate greater than the rate the DPC receives the data processor instructions from the SISD processor.

The invention may exploit two properties of a data processor instruction stream or a block of instructions produced by a typical application. Firstly, individual instructions and blocks of instructions can be repeated. Secondly, the instruction stream can be compressed. The performance can be further increased by recognising that most loops in the data processor instruction stream will change either the operand/result address or (for scalar-vector operations) the scalar value, or both, during each iteration.

The data processor instructions may include specific instructions for controlling the operation of the multiplication circuit. In this way it is not necessary to pre-load the circuit with a set of specific tasks that the circuit can be required to carry out. Rather, the provision of the specific instructions within the data processor instructions enables the instruction stream generated by the DPC to be multiplied out, at run time, into a format that is suitable for the data processor, without any predetermined knowledge of the specific multiplication processes that are required. Accordingly, the data processor controller of the present invention is very flexible and does not require complicated additional circuitry which can also be expensive.

Another way of considering the multiplication aspect of the present invention is that the data processor instructions received by the multiplication circuit are increased in number by being expanded out. This feature enables the bandwidths of physical data paths between a data processor instruction generator, the multiplying circuit and the data processor itself to be fully used with maximum efficiency; each data path operating at its optimum capacity. In addition, the data processor instructions can be generated in a compounded format and can be separated by the multiplication circuit before reaching the data processor in a non-compounded format. Therefore advantageously, the data processor instruction generator can output instructions to the multiplying circuit along a relatively small bandwidth pathway and from the multiplication circuit to the data processor along a relatively large bandwidth pathway, without the overall performance being limited by the slowest of the pathways.

Expressed another way, the invention resides in a data processor controller for controlling a data processor, comprising: a first processor for issuing data processor instructions at a first rate; multiplying means for receiving the data processor instructions issued by the first processor, multiplying the data processor instructions, and generating the multiplied data processor instructions to the data processor at a second rate, the second rate being greater than the first rate.

From one aspect, the invention resides in a data processor controller comprising instruction generating means for generating data processor instructions at a first rate and instruction accelerating means for receiving the data processor instructions at the first rate and being arranged to multiply the instructions and forward the multiplied instructions to the data processor at a second rate substantially greater than the first rate.

Within the same inventive concept, the invention also encompasses a bandwidth multiplier for multiplying data processor instructions for controlling a data processor, the bandwidth multiplier comprising: input means for receiving instructions; and bandwidth multiplying means for multiplying data processor instructions contained in the instructions received by the input means.

The invention extends to a method for controlling a data processor, comprising the steps of: issuing data processor instructions at a first rate; reading the data processor instructions; multiplying the data processor instructions; and writing the multiplied data processor instructions to the data processor at a second rate, the second rate being greater than the first rate.

The foregoing summary of the invention, as well as the following detailed description of the preferred embodiments, will be better understood when read in conjunction with the appended drawings. For the purposes of illustrating the invention, there are shown in the drawings embodiments that are presently preferred, it being understood, however, that the invention is not limited to the specific arrangements disclosed.

In the drawings:

FIG. 1 is a block diagram showing a standalone case of the prior art;

FIG. 2 is a block diagram showing a co-processor case of the prior art;

FIG. 3 is a block diagram showing a direct microprocessor drive data processor controller (DPC) of the prior art;

FIG. 4 is a block diagram showing a custom micro-code sequencer DPC of the prior art;

FIG. 5 is a block diagram showing a DPC architecture according to an embodiment of the present invention;

FIG. 6 is a block diagram showing the bandwidth multiplier used in the DPC shown in FIG. 5;

FIG. 7 is a block diagram showing the block repetition engine used in the bandwidth multiplier shown in FIG. 6;

FIG. 8 is a block diagram showing a bandwidth multiplier according to another embodiment of the present invention;

FIG. 9 is a block diagram showing a DPC architecture according to a further embodiment of the present invention;

FIG. 10 is a block diagram showing the bandwidth multiplier used in the DPC of FIG. 9; and FIG. 11 is a block diagram showing the block repetition engine used in the bandwidth multiplier shown in FIG. 10.

FIGS. 1 to 4 were discussed in the introduction to outline the prior art. Referring now to FIG. 5, this shows a data processor controller (DPC) architecture in accordance with a preferred embodiment of the invention in the standalone case. The DPC architecture comprises a data processor 505 and a DPC which in turn comprises a microprocessor 501 and a bandwidth multiplier 503. The data processor 505 is a Single Instruction stream operating on Multiple Data (SIMD) processor. The microprocessor 501 may be a digital signal processor (DSP).

In co-processor cases, the DPC architecture further comprises a Single Instruction stream operating on Single Data (SISD) processor connected to the DPC controlling the data processor. In practice, systems can be built which have a single SISD processor fulfilling the SISD processor and DPC roles, but in the case where the SISD processor has a number of tasks to perform and cannot spend enough time feeding the bandwidth multiplier, two SISD processors, i.e. one as a SISD processor and the other as a DPC microprocessor, would be used.

As shown in FIG. 5, the data processor's M-bit-wide instruction 507 and N-bit-wide status/result interfaces 509 are connected via the bandwidth multiplier 503 to a P-bit-wide interface to the address/data bus or I/O channel 511 of the microprocessor 501. In general M and/or N will be larger than P.

The software program in the microprocessor 501 builds a combined M*-bit-wide instruction containing data processor instructions plus control information for the bandwidth multiplier 503, and writes the combined M*-bit-wide instruction in a compressed form P bits at a time, i.e., in P-bit-wide words, to the bandwidth multiplier 503. When a complete compressed instruction has been written in this way, the bandwidth multiplier 503 uses it to generate a sequence of M-bit-wide instructions 507 to the data processor 505. The N-bit status/result 509 of the data processor 505 is read by the microprocessor 501 P bits at a time.

When the combined M*-bit instruction represents a loop in the data processor instruction stream that requires a different scalar value for each iteration of the loop, the software program in the microprocessor 501 must additionally send the sequence of scalar data values to the bandwidth multiplier 503. This sequence is also written P bits at a time.

FIG. 6 is a block diagram of a preferred embodiment of the bandwidth multiplier 503 shown in FIG. 5. The bandwidth multiplier 503 comprises the following five elements:

1. Input FIFO 601 which allows the microprocessor 501 to operate asynchronously to the circuits of the bandwidth multiplier 503 and the data processor 505;
2. Instruction Fetch Engine (IFE) 603 which reads compressed instructions from the input FIFO 601 and decompresses them;
3. Block Repetition Engine (BRE) 605 which repeats a run of instructions;
4. Instruction Repetition Engine (IRE) 607 which repeats individual instructions; and
5. Output buffer 609 which is connected to the microprocessor 501 and the data processor 505.

The input FIFO 601 is loaded with a block of information comprising a sequence of P-bit-wide words that make up the compressed combined M*-bit-wide instruction generated by the microprocessor 501 and any associated scalar data values. Each word is stored in the input FIFO 601 along with a tag that defines which part of the instruction it represents. The value of this tag can be obtained in two ways. It can be part of the word written by the microprocessor 501 or it can be in addition to the word, e.g. derived from the address to which the microprocessor 501 writes.

The use of an input FIFO 601 instead of a simple buffer allows the bandwidth multiplier 503 to operate asynchronously to the microprocessor 501. The specific advantage of this is that the microprocessor 501 can use the time that the bandwidth multiplier 503 is generating a long sequence from already loaded instructions to generate and load the next instructions. In other words, the FIFO allows pipelining, namely overlapping between the generation of data processor instructions by the bandwidth multiplier 503 and the generation and loading of instructions by the microprocessor 501.

The IFE 603 reads a compressed instruction as a sequence of p*-bit-wide words, namely tagged P-bit-wide words from the input FIFO 601. Then, the IFE 603 decompresses the compressed instruction by using the tag to identify which field of the instruction the word represents. Those fields of the instruction not specified at the end of the decompression process are set to their default value or to the value previously loaded. Any scalar data values provided for use during a data processor loop are separated from the instruction stream by the IFE 603, and stored in the scalar write FIFO 611.

The BRE 605 receives the decompressed instructions from the IFE 603; FIG. 7 shows details of the BRE 605. The BRE 605 accepts the decompressed instructions from the IFE 603 and stores them in a buffer memory 701. It sends instructions from this buffer memory 701 to the IRE 607, optionally replacing some fields in the instruction with values taken from BRE registers 703. Normally, when an instruction is sent to the IRE 607 it is discarded from the buffer memory 701, but repeat control logic 705 allows a block or nested blocks of instructions to be held in the buffer memory 701 and repeatedly sent to the IRE 607 for a deterministic number of iterations (i.e. a FOR loop) or a non-deterministic number of iterations (i.e. a REPEAT loop). Status lines 707 from the data processor 505 and the microprocessor 501 are used to terminate the REPEAT loop.

To allow the operand/result address fields of the instruction to change on each iteration of a block, the BRE 605 contains one or more registers 703 whose value can be multiplexed into the IRE 607 instruction by a multiplexer 709. Fields in the BRE instruction control the preloading, post-incrementing and post-decrementing of these registers 703. A register can be loaded, used and modified in the same instruction. The control logic 705 suppresses the pre-loading of registers 703 on the second and subsequent iteration of a block.

To allow the scalar data value to change on each iteration of a block, the BRE 605 can also multiplex values taken from the scalar write FIFO 611 into the IRE 607 instruction using the multiplexer 709.

Returning to FIG. 6, the IRE 607 accepts an instruction from the BRE 605 and generates from it a sequence of zero or more of the same data processor instruction. Control logic allows the length of this sequence to be deterministic or to continue until or while an external condition, typically data processor status, is valid. The IRE 607 issues a data processor 505 no-operation instruction when an instruction is not available from the BRE 605.

When controlling a data processor such as the ASP, where each instruction is split into a number of sequentially executed sub-instructions, the IRE 607 may be extended to allow each sub-instruction to be individually repeated within each repetition of the overall instruction.

The output buffer 609 provides a means for the microprocessor 501 to read the status of the bandwidth multiplier 503 or read a result or status from the data processor 505. Control logic allows the microprocessor 501 to synchronise with the data processor 505 and the bandwidth multiplier 503. The output buffer 609 may be implemented as a simple register, small memory or FIFO.

A variation on the above-described bandwidth multiplier is shown in FIG. 8. In this embodiment, the IFE 603 is extended by adding a Direct Memory Access Controller (DMAC) thus giving it the capability of fetching compressed instructions or scalar data values direct from memory 801. This relieves the microprocessor 501 of the burden of loading code into the bandwidth multiplier 503, other than a block's details and typically allows a higher sustained input instruction rate than can be achieved by the microprocessor 901.

Thus, the invention realises:

The generation of the data processor instructions at runtime by a microprocessor or DSP device instead of calling micro-coded routines.

The use of a circuit for multiplying the rate at which data processor instructions can be generated by a microprocessor or DSP device.

Techniques for multiplying the instruction generation bandwidth.

The main benefits of the invention are:

DPC programming flexibility. The DPC capabilities are not restricted to the facilities provided by the custom micro-code sequencer design.

Size and Power. The new DPC can easily be implemented in a silicon device with an active area of less than 65 $mm^2$ with a consumption of 200 mW compared to 1248 $cm^2$ and 60W for the previous generation.

Cost and Reliability. The new DPC can be implemented in a single silicon device that would cost a few tens of pounds. Such a single-device solution will be significantly more reliable than the previous solution that contained hundreds of devices.

These benefits open a number of new application areas. The invention will enable the move of massively parallel processing from "big box" custom equipment to the card based OEM market (e.g. VME and PC card based system builders). The small size and power requirements of the new DPC will enable the integration of data processors into the core processors of PC and workstation computers. This in turn will enable such desktop computers to address new applications. An example of this would be the 3D medical imaging and rendering markets. Currently systems capable of supporting these applications cost £1M to £10M, but cannot provide proper real-time performance. Desk top computers with integrated data processors will be able to give real-time performance for £10K to £100K. Finally the programming flexibility and small size and power requirements of the new DPC enable the DPC and the data processor to be integrated. This integration would enable a new level of data processor performance by eliminating the need to send the high-bandwidth data processor instructions off the device.

The DPC programming flexibility is achieved because the microprocessor indirectly generates the data processor instruction at run-time and is not restricted to simply calling preloaded micro-code routines which can only perform tasks for which the hardware has been designed.

The reduction in size and power is achieved through:

The simplicity of the bandwidth multiplier with its clear partitioning into a number of stages each with simple control. Even the BRE can be realised by a modified RAM-based FIFO and multiplexer and some loadable counters. This is far less complex than the full microcode sequencer at the heart of most DPC designs.

The flexibility and capability of the microprocessor to perform the more complex DPC functions thus eliminating specialised hardware solutions for specific functions.

The linear fetching of instructions by the IFE. This allows block/burst mode memory transfer which in turn allows the use of smaller memory technology.

The overall system cost is not only reduced by the small size of the DPC but by the ability of the DPC to interface with cheaper memory devices using block/burst mode transfers and thus avoiding the need for high speed static memory.

EXAMPLE 1

The following is an example using the DPC system shown in FIGS. 5–7. The instruction sequence that needs to be fed to the data processor 505 for a particular application is:

{A, {B}32, C, D}16 where A, B, C and D are data processor instructions, and {...}N means to repeat the instruction inside the braces N times. A is parameterised with the address of operand 1, C is parameterised with the address of operand 2 and D is parameterised with the address of the result.

Each uncompressed instruction that must be generated by the microprocessor 501 has the following format:

<data processor instruction><IRE ctrl ><BRE ctrl><BRE parameters> where the data processor instruction is assumed to have three 32-bit fields (a, b & c) and fields b and c can be replaced by BRE parameters or take default values. The IRE ctrl, BRE ctrl and BRE parameters are assumed to require an additional 64 bits. Thus, each uncompressed instruction requires 160 bits.

The uncompressed instructions that the microprocessor 501 must generate are:

A(a,b,c) & Start of block & BRE ctrl & BRE parameters for operand 1

B(a,b,c) & Repeat instruction 32 times

C(a,b,c) & BRE ctrl & BRE parameters for operand 2

D(a,b,c) & Repeat block 16 times & BRE ctrl & BRE parameters for result

When compressed by the microprocessor 501, these instructions might be:

| | |
|---|---|
| A(a) & Start of block & BRE ctrl & BRE parameters for operand 1 | (96 bits) |
| B(a) & Repeat instruction 32 times | (64 bits) |
| C(a,c) & BRE ctrl & BRE parameters for operand 2 | (128 bits) |
| D(a) & Repeat block 16 times & BRE ctrl & BRE parameters for result | (96 bits) |

Hence to generate 560 (=(1+1*32+1+1)*16) 96-bits-wide data processor instructions, the microprocessor 501 must write a block instruction comprising 12 (=3+2+4+3) 32-bit-wide words to the bandwidth multiplier 503.

The 12 32-bit-wide words are accepted by the IFE 603 via the input FIFO 601 along with tags added by the input FIFO 601. The IFE 603 decompresses the words using the tags and generates 4 160-bit-wide instructions. Thus, this stage speeds up 4*160/12*32=1.67 times in terms of the instruction generation bandwidth.

The decompressed 4 160-bit-wide instructions are then accepted by the BRE 605, which repeats 16 times the block of 4 128-bit-wide instructions using the BRE control information and BRE parameters contained in the decompressed instructions. Thus, this stage speeds up (16*4*128/(4*160)= 12.8 times.

The 4 128-bit-wide instructions issued by the BRE 605 are accepted by the IRE 607, which issues 35 (=1+1*32+ 1+1) 96-bit-wide instructions to the data processor 505 using the IRE control information contained in the received 4 128-bit-wide instructions. Thus, this stage speeds up (35*96/ (4*128)=6.56 times.

Consequently, for this example, the bandwidth multiplier 503 has achieved a speed-up of over 140 (=1.67*12.8*6.56) times.

This example also highlights the purpose of the input FIFO 601. If the above instructions are generated in isolation then the first time through the loop only the speed-up due to the IFE 603 and IRE 607 is obtained, but if a similar sequence of instructions preceded this one then the BRE 605 should have been pre-loaded and full speed-up will be obtained.

EXAMPLE 2

The μLAC™ (micro low-level associative string processor controller) is an implementation of the invention designed and manufactured by the Applicant for use with their ASP (associative string processor) data processor as previously described. The μLAC generates a data processor instruction every 33 nS. Except for the input FIFO 1001 and the output buffer 1013, the μLAC is implemented in a single 1 μm silicon device with an active area of 65 mm² that consumes 200 mW.

As shown in FIG. 9, the μLAC 903 is connected between a microprocessor 901 and the ASP 905. FIG. 10 shows a block diagram of the μLAC 903. In the following simplified description of the μLAC 903, what previously was referred to as the IRE is now called the Slot Repetition Engine (SRE) 1007 to reflect the fact that sub-instructions are issued to the ASP 905 in pairs and the output buffer 1013 has been supplemented by a scalar read FIFO 1015. In addition, the scalar write FIFO 1011 is connected directly to the microprocessor 901 rather than being fed from the IFE 1003, and values taken from this FIFO 1011 are merged into the SRE instruction by the SRE 1007 rather than by the BRE 1005.

Through the input FIFO 1001, the μLAC instruction is loaded by splitting it into a sequence of 32-bit-wide words and writing each word to one of 16 addresses. The data value written and the address used are combined into a 36-bit value that is stored in the FIFO 1001. The address is used to generate a tag that defines which part of the instruction the data value represents.

The IFE 1003 reads and decompresses an instruction from the input FIFO 1001 or the library memory 1009. Decompression is performed by using the 4-bit tag to identify which field of the instruction the other 32 bits represent. Those fields of the instruction not specified at the end of the decompression process are set to their default value or to the value previously loaded. The IFE 1003 handles two main types of instructions: BRE and Library Memory. BRE instructions are sent to the BRE 1005. Library Memory instructions instruct the IFE 1003 to fetch a block of instructions from the library memory 1009 instead of the FIFO 1001. The BRE 1005 receives the decompressed instructions.

FIG. 11 shows details of the BRE 1005. Instructions from the IFE 1003 are stored in the buffer memory 1101. The buffer memory 1101 is a modified FIFO that normally discards each instruction as it is outputted, but also allows a block of instructions to be retained and repeatedly issued. The method used for this is the block marker register 1103. This register follows the read pointer 1105 in normal FIFO operating mode. To mark the start of a block, the block marker 1103 is frozen so that it points to the address the block starts at. To repeat a block, the read pointer 1105 is loaded from the block marker 1103. Comparing the write pointer 1107 and the block marker 1103 allows the FIFO-full condition to be detected. Comparing the Read and Write pointers allows the FIFO-empty condition to be detected. The output of the buffer memory 1101 is divided into the following fields:

<ASP and SRE instruction><BRE Control><BRE Parameters>

The BRE Control field drives control logic 1109. The control logic 1109 allows a block of instructions to be held in the buffer memory 1101 and repeatedly issued for a deterministic number of iterations (i.e. a FOR loop) or a non-deterministic number of iterations (i.e. a REPEAT loop). The external status lines 1111 from the ASP 905 and the microprocessor 901 are used to terminate the REPEAT loop. Fields from the BRE Parameters determine the number of FOR loops. The control logic 1109 also controls the pre-loading, post-incrementing and post-decrementing of the sfa1, sfa2, sfa3 and sra registers 1113 suppressing the pre-loading on the second and subsequent iteration of a block.

All four registers 1113 are loaded with values taken from the BRE Parameters field. The outputs from sfa1, sfa2 and sfa3 registers are multiplexed into the operand/result address fields of the ASP instruction by a multiplexer 1115. The output of the sra register is used to multiplex a bit from a BRE Parameters field into the ASP instruction.

Returning to FIG. 10, the SRE 1007 accepts an instruction from the BRE 1005 and generates from it a sequence of ASP instructions. Control logic allows the length of this sequence to be deterministic or to continue until or while some condition is valid. This condition could be the state of an ASP status signal or could be either the empty flag of the scalar write FIFO 1011 or the full flag of the scalar read FIFO 1015. The SRE 1007 issues to the ASP 905 no-operation instructions when an instruction is not available from the BRE 1005.

The Data and Activity fields of the generated ASP instruction are not changed, but the Control field can be either of the following sequences:

{a}, {b} or

{{a}, b} where { } means to repeat zero or more times and ab is the ASP Control pair from which the sequence was generated. In fact a zero length sequence is not generated: instead, a no-operation ASP Control pair is produced. The current implementation of the μLAC does not support the sequence {a, {b}} or the more general case of

{{a}, {b}}

The SRE 1007 can also multiplex a value taken from the scalar write FIFO 1011 into the Data field of the ASP instruction.

The scalar read FIFO 1015 provides a means for the microprocessor 901 to asynchronously read results from the ASP 905.

The output buffer 1013 provides a means for the microprocessor 901 to read the status of the μLAC 903 or the status of ASP 905.

Control logic of the output buffer 1013 synchronises the microprocessor 901 and the ASP 905 before allowing a read of the ASP status to complete by ensuring that the μLAC 903 has completed all instructions loaded prior to the read.

The following is a full description of μLAC's microprocessor interface.

The microprocessor to μLAC interface consists of the following registers:

| Number | Address | Bits | Mode | Function |
|---|---|---|---|---|
| 0 | 0040,0000 | 00:15 | w | Write breIW1:AGbus control word A |
|   |   | 16:31 | w | Write breIW1:AGbus control word B |
| 1 | 0040,0004 | 00:31 | w | Write breIW2:AGbus literal data |
| 2 | 0040,0008 | 00:15 | w | Write breIW3:AGbus activity bits |
|   |   | 16:21 | w | Write breIW3:BRE control word |
| 3 | 0040,000C | 00:31 | w | Write breIW4:SRE control word |
| 4 | 0040,0010 | 00:13 | w | Write brePW1:Loop length 1 |
|   |   | 14:19 | w | Write brePW1:Serial field offset 1 |
|   |   | 20:25 | w | Write brePW1:Serial field offset 2 |
|   |   | 26:31 | w | Write brePW1:Serial field offset 3 |
| 5 | 0040,0014 | 00:15 | w | Write brePW2:Loop length 2 |
|   |   | 16:27 | w | Write brePW2:Shift distance |
| 6 | 0040,0018 | 00:31 | w | Write brePW3:Scalar register |
| 7 | 0040,001C | 00:31 | w | Write brePW4:Trap line number |
| 8 | 0040,0020 | 03:18 | w | Initiate library memory call:Start address |
|   |   | 19:31 | w | Initiate library memory call:Block length |
| 9 | 0040,0024 | 03:18 | w | Initiate library memory load:Start address |
|   |   | 19:31 | w | Initiate library memory load:Block length |
| 10 | 0040,0028 | 03:18 | w | Initiate library memory dump: Start address |
|   |   | 19:31 | w | Initiate library memory dump:Block length |

-continued

| Number | Address | Bits | Mode | Function |
|---|---|---|---|---|
| 16 | 0050,0000 | 00:31 | w | Write scalar write FIFO data with tag bits 0000B |
| 17 | 0050,0004 | 00:31 | w | Write scalar write FIFO data with tag bits 0001B |
| . | . | . | . | . |
| . | . | . | . | . |
| . | . | . | . | . |
| 31 | 0050,003C | 00:31 | w | Write scalar write FIFO data with tag bits 1111B |
| 48 | 0060,0000 | 00 | w | Write loop rendezvous flag & perform rendezvous |
| 0 | 0040,0000 | 00:31 | r | Read library memory dump result (data) |
| 1 | 0030,0000 | 00:03 | r | Read library memory dump result (address) |
| 16 | 0050,0000 | 00:31 | r | Read scalar read FIFO data (data word) |
| 17 | 0030,0000 | 00:03 | r | Read scalar read FIFO data (tag bits) |
| 32 | 0070,0000 | 00:07 | r | Read SRE & AGbus status |
| 33 | 0070,0004 | 00:31 | r | Read trap line number & clear interrupt |

All registers are accessed as 32-bit-wide words, regardless of which bit fields are being used.

When writing BRE instruction words, writing to breIW1 causes the instruction to be transmitted to the BRE 1005. If any of the other instruction words have not been written since the last instruction was transmitted, default values will be used for those words. The BRE parameter words retain their last written value.

When initiating a library memory call, load or dump, bits 3 to 18 of the data are used as the start address and bits 19 to 31 are used as the block length. The block length must lie in the range 1 . . . 8191. The library memory operations are defined as follows:

Call LM=>BRE
Load ISM=>LM
Dump LM=>ISM

When a library memory load has been initiated, the next N words (where N is the block length) written to one of the registers at addresses 0 to 8 will be stored in the library memory 1009, along with the address it was written to. When N words have been written, normal operation resumes.

When a library memory dump has been initiated, N words should be read from the register at address 0, which correspond to the data stored in the library memory 1009. After each word has been read, the register at address 1 may be read, which contains the address associated with that word.

When a library memory call has been initiated, N words are taken from the library memory and written to the associated address. Library memory calls may be nested to one level deep. Note that initiating a library memory call takes two clock cycles, one to write the start address and block count, the other to allow for the pipeline delay in the library memory 1009.

When writing data to the scalar write FIFO 1011, four tag bits can be associated with each word. These are set according to the address to which the data is written. The use of these tag bits is not yet defined.

When reading data from the scalar read FIFO 1015, after each data word is read from register 16, four associated tag bits can be read from register 17.

The BRE Register Control Word is produced as follows. When the AGbus control word A contains the bit pattern 10xxxxxxxxxx01xx (corresponding to an InitSearchOrAddSerial, ClearSerial, InitWriteSerial, or InitRead), the upper 16 bits of the AGbus literal data are used to control BRE register operations, and are divided into the following fields:

| Field | Size | Name | Meaning |
|---|---|---|---|
| 16:18 | 3 | aSel | Register A select (see below) |
| 19 | 1 | aInc | Post-increment register A (0 = FALSE, 1 = TRUE) |
| 20 | 1 | aDec | Post-decrement register A (0 = FALSE, 1 = TRUE) |
| 21 | 1 | aLoad | Pre-load register A (0 = FALSE, 1 = TRUE) |
| 22:24 | 3 | bSel | Register B select (see below) |
| 25 | 1 | bInc | Post-increment register B (0 = FALSE, 1 = TRUE) |
| 26 | 1 | bDec | Post-decrement register B (0 = FALSE, 1 = TRUE) |
| 27 | 1 | bLoad | Pre-load register B (0 = FALSE, 1 = TRUE) |
| 28 | 1 | srInv | Invert ScalarRegister output |

The aSel field selects which BRE register will be acted on by the aInc, aDec, and aLoad fields, and controls muxing of the register contents into the instruction stream as follows:

| Value | Name | BRE Register | Mux Control |
|---|---|---|---|
| 0 | srd1 | sra | sr[sra] => AGbus data word sd1 data bit |
| 1 | srd2 | sra | sr[sra] => AGbus data word sd2 data bit |
| 2 | srfz | sra | sr[sra] => AGbus control word B fz |
| 3 | smu | sra | — |
| 4 | sfa1 | sfa1 | sfa1 => AGbus data word sfa1 |
| 5 | sfa2 | sfa2 | sfa2 => AGbus data word sfa1 |
| 6 | sfa3 | sfa3 | sfa3 => AGbus data word sfa1 |
| 7 | NoReg | — | |

The bSel field selects which BRE register will be acted on by the bInc, bDec, and bLoad fields, and controls muxing of the register contents into the instruction stream as follows:

| Value | Name | BRE Register | Mux Control |
|---|---|---|---|
| 0 | srd1 | sra | sr[sra] => AGbus data word sd1 data bit |
| 1 | srd2 | sra | sr[sra] => AGbus data word sd2 data bit |
| 2 | srfz | sra | sr[sra] => AGbus control word B fz |
| 3 | smu | sra | — |
| 4 | sfa1 | sfa1 | sfa1 => AGbus data word sfa1 |
| 5 | sfa2 | sfa2 | sfa2 => AGbus data word sfa1 |
| 6 | sfa3 | sfa3 | sfa3 => AGbus data word sfa1 |
| 7 | NoReg | — | |

When aLoad or bLoad is TRUE, the selected BRE register is loaded from the BRE parameter words as follows:

| Register | Load Value |
|---|---|
| sfa1 | brePW1:Serial field offset 1 |
| sfa2 | brePW1:Serial field offset 2 |
| sfa3 | brePW1:Serial field offset 3 |
| sra | brePW1:Serial field offset 3 |

Loading occurs before the register contents are multiplexed into the data word, whilst incrementing and decrementing occur afterwards.

The srInv field allows the output of the scalar register to be inverted before being multiplexed into the data or instruction words.

The BRE control word is divided into the following bit fields:

| Field | Size | Name | Meaning |
|---|---|---|---|
| 00 | 1 | LoopEntry | Loop entry flag (0 = FALSE, 1 = TRUE) |
| 01 | 1 | LoopExit | Loop exit flag (0 = FALSE, 1 = TRUE) |
| 02:04 | 3 | Condition | Loop exit test condition (see below) |
| 05 | 1 | lcSource | Loop counter load source (see below) |

The loop entry flag indicates the beginning of a loop and the loop exit flag indicates the end of a loop. These may both occur in the same instruction.

The loop counter load sources are as follows:

| Value | Name | Meaning |
|---|---|---|
| 0 | Length1 | Load loop counter from brePW1:Loop length 1 |
| 1 | Length2 | Load loop counter from brePW2:Loop length 2 |

The loop exit test conditions are as follows:

| Value | Name | Meaning |
|---|---|---|
| 0 | lc0 | Loop count is zero |
| 1 | lc1 | Loop count is one |
| 2 | mr1F | Match reply 1 is FALSE; |
| 3 | mr1T | Match reply 1 is TRUE; |
| 4 | mr2F | Match reply 2 is FALSE; |
| 5 | mr2T | Match reply 2 is TRUE; |
| 6 | 1rfF | Loop rendezvous flag is FALSE; |
| 7 | 1rfT | Loop rendezvous flag is TRUE; |

The loop counter is pre-loaded with the selected initial value at the start of the loop, and is decremented each time round the loop. The loop count is tested before it is decremented.

The BRE 1005 waits for the last instruction in a loop to complete before testing either of the match reply lines. It performs a loop rendezvous with the ISM before testing the state of the loop rendezvous flag.

The SRE control word is divided into the following bit fields:

| Field | Size | Name | Meaning |
|---|---|---|---|
| 00:03 | 4 | mValue | Repeat value M |
| 04:14 | 11 | nValue | Repeat value N |
| 15 | 1 | RepeatMode | Repeat mode (see below) |
| 16:18 | 3 | RepeatType | Repeat type (see below) |
| 19:20 | 2 | WaitSource | Wait source (see below) |
| 21 | 1 | DataSource | Data source (see below) |
| 22 | 1 | DataMask | Data mask (see below) |
| 23 | 1 | DataDir | Data direction (0 = Write, 1 = Read) |
| 24:27 | 4 | DataTag | Tag bits for read data |
| 28:31 | 4 | LacInst | LAC instruction (see below) |

The repeat modes are as follows:

| Value | Name | Meaning |
|---|---|---|
| 0 | Slot | Repeat pattern is m(a) n(b) |
| 1 | Inst | Repeat pattern is n(m(a) b) |

The values of m and n are selected by the repeat type, as follows:

| Value | Name | Meaning |
|---|---|---|
| 0 | Immediate | Use M and N values in SRE control word. |
| 1 | Partition | Set repeat lengths to 1, use M and N values to initialise ActivateSlots and AlternateSlots. |
| 2 | DelayAct | Use ActivateSlots in place of M value. |
| 3 | DelayAlt | Use AlternateSlots in place of N value. |
| 4 | ShiftTr1 | Use ABS(ShiftDistance) in place of N value, drive tr1 shift control with SIGN(ShiftDistance). |
| 5 | ShiftTr2 | Use ABS(ShiftDistance) in place of N value, drive tr2 shift control with SIGN(ShiftDistance). |
| 6 | ShiftTr12 | Use ABS(ShiftDistance) in place of N value, drive tr1 and tr2 shift control with SIGN(ShiftDistance). |
| 7 | ShiftNone | Use ABS(ShiftDistance) in place of N value, drive tr1 and tr2 shift control from input control word. |

Note that when the tr1 or tr2 shift controls are driven, both AGbus control words are affected.

The wait sources are as follows:

| Value | Name | Meaning |
|---|---|---|
| 0 | NoWait | — |
| 1 | Data | For data writes, wait for data available in FIFO For data reads, wait for space available in FIFO |
| 2 | vlr | Wait for VDB load rendezvous |
| 3 | vdr | Wait for VDB dump rendezvous |

If a wait is selected, no-ops are inserted into the instruction stream until the selected wait condition is satisfied. This occurs before the associated instruction is executed.

Selecting the data wait source automatically causes data to be read from or written to the appropriate FIFO. For data reads this is the scalar read FIFO 1015. For data writes, this is selected by the data source, as follows:

| Value | Name | Meaning |
|---|---|---|
| 0 | Global | Take data from scalar write FIFO |
| 1 | Local | Take data from APEA |

The mask bits for ternary write data can either be taken from the appropriate FIFO or taken from the literal data. This is selected by the data mask, as follows:

| Value | Name | Meaning |
|---|---|---|
| 0 | InData | Take mask bits from FIFO data |
| 1 | InInst | Take mask bits from literal data |

The LAC instructions are as follows:

| Value | Name | Function |
|---|---|---|
| 0 | NoOp | — |
| 2 | ClrInj | Set link inject value to '0' |
| 3 | SetIrj | Set link inject value to '1' |
| 4 | ClrSeg | Set no link segmentation |
| 5 | SetSegA | Segment links at AGbus |
| 6 | SetSegC | Segment links at I/O channel |

-continued

| Value | Name | Function |
|---|---|---|
| 7 | SetSegD | Segment links at device |
| 8 | TrapMr1T | Trap on MR1 TRUE |
| 9 | TrapMr1F | Trap on MR1 FALSE |

The SRE & AGbus status register consists of the following bits:

| Bit | Name | Meaning |
|---|---|---|
| 0 | mr1 | State of match reply 1 |
| 1 | mr2 | State of match reply 2 |
| 2 | — | Reserved |
| 3 | — | Reserved |
| 4 | — | Reserved |
| 5 | — | Reserved |
| 6 | Halt | SRE has halted due to a trap instruction |
| 7 | irq | SRE is requesting an interrupt |

The present invention may be embodied in other specific forms without departing from its essential attributes. Accordingly, reference should be made to the invention as set out in the appended claims and other general statements herein rather than to the foregoing specific description as indicating the spirit and scope of the invention.

What is claimed is:

1. A data processor controller for generating, preparing and issuing data processing operations for a data processor coupled to the controller, the data processor controller comprising:
   instruction generating means for generating data processor instructions at a first rate; and
   instruction accelerating means for receiving the data processor instructions at the first rate and being arranged to prepare the instructions by multiplying the same, to issue the multiplied instructions to the data processor at a second rate substantially greater than the first rate, and to isolate the preparation of the instructions from their issue;
   wherein the instruction accelerating means is arranged to issue repeated nested blocks of instructions asynchronously with the receipt of the data processing instructions from the instruction generating means and to prepare concurrently other types of data processing instructions for subsequent issue as said multiplied instructions, and comprises a de-coupler for asynchronously de-coupling the accelerating means from the instruction generating means and a data memory for storing the nested blocks of instructions.

2. A data processor controller as defined in claim 1, wherein the instruction accelerating means is a bandwidth multiplier that is arranged to increase the instruction generation bandwidth.

3. A data processor controller as defined in claim 1, wherein the instruction generating means is arranged to write block instructions to the instruction accelerating means.

4. A data processor controller as defined in claim 1, wherein the instruction accelerating means is arranged to repeat individual instructions.

5. A data processor controller as defined in claim 1, wherein the data processor instructions include instructions for controlling the operation of the instruction accelerating means.

6. A data processor controller as defined in claim 5, wherein the instructions generated by the instruction generating means include repetition control information and parameters.

7. A data processor controller as defined in claim 1, wherein the repetition operation of the instruction accelerating means is arranged to repeat blocks of instructions a deterministic number of times and a non-deterministic number of times.

8. A data processing controller as defined in claim 1, wherein the repetition operation of the instruction accelerating means is arranged to be dependent on the status of the instruction generating means and the status of the data processor.

9. A data processor controller as defined in claim 1, wherein the instruction accelerating means is arranged to receive and input a different scalar value into each repetition of a block of instructions.

10. A data processor controller as defined in claim 1, wherein the instruction generating means is arranged to generate data processor instructions in a compounded format and the instruction accelerating means is arranged to separate out the compounded instructions into a non-compounded format.

11. A data processor controller as defined in claim 1, wherein the instruction generating means is arranged to generate a compressed stream of data processing instructions and the instruction accelerating means is arranged to decompress the instruction stream.

12. A data processor controller as defined in claim 11, wherein the instruction accelerating means is arranged to store address-generated tags for the purposes of decompression.

13. A data processor controller as defined in claim 1, wherein the instruction generating means is a microprocessor or digital signal processor.

14. A data processor controller as defined in claim 1, wherein the instruction generating means, the instruction accelerating means and the data processor constitute a co-processor handling tasks delegated by a controlling processor.

15. A data processor controller as defined in claim 14, wherein the data processor and the controlling processor are integrated into a single processor.

16. A data processor controller as defined in claim 1, wherein the de-coupler comprises an input FIFO.

17. A data processor controller as defined in claim 1, wherein the instruction accelerating means comprises an instruction fetch engine adapted for linear fetching of instructions.

18. A processor-controlled apparatus including a data processor controller as defined in claim 1.

19. A data processor controller as defined in claim 9, wherein the instruction accelerating means comprises a FIFO for storing the different scalar values for input into each repetition of a block of instructions.

20. A data processor controller as defined in claim 9, wherein the instruction accelerating means is arranged to suspend the issuance of the repeated blocks of instructions until the appropriate scalar value has been received.

21. A data processor controller for controlling a data processor coupled to the controller by issuing, preparing and providing data processing operations for the data processor, the data processor controller, comprising:
   a first processor for issuing data processor instructions at a first rate;
   multiplying means for receiving the data processor instructions issued by the first processor, preparing the data processor instructions for provision to the data processor by multiplying the data processor instructions, providing the multiplied data processor instructions to the data processor at a second rate greater than the first rate, and isolating the preparation of the instructions from the provision of the instructions, wherein the multiplying means is arranged to provide repeated nested blocks of instructions asynchronously with the receipt of the data processing instructions from the first processor and to prepare concurrently other types of data processing instructions for subsequent provision to the data processor as said multiplied instructions, and comprises a de-coupler for asynchronously de-coupling the multiplying means from the first processor and a data memory for storing the nested blocks of instructions.

22. A data processor controller as defined in claim 21, wherein the multiplying means comprises a bandwidth multiplier by which the bandwidth of the data processor instructions generated by the bandwidth multiplier is increased from the bandwidth of the data processor instructions issued by the first processor.

23. A data processor controller as defined in claim 22, wherein the first processor is arranged to compress the data processor instructions and the bandwidth multiplier is arranged to decompress the compressed data processor instructions.

24. A data processor controller as defined in claim 22, wherein the first processor is arranged to add bandwidth multiplier control information to the data processor instructions, and the bandwidth multiplier is arranged to multiply the data processor instructions in accordance with the bandwidth multiplier control information.

25. A data processor controller as defined in claim 22, wherein the bandwidth multiplier is arranged to receive status/result information from the data processor and the first processor.

26. A data processor controller as defined in claim 25, wherein the bandwidth multiplier is arranged to multiply the data processor instructions in accordance with the status information received from the data processor and the first processor.

27. A data processor controller as defined in claim 22, wherein the first processor is arranged to generate a stream of data and instructions comprising said data processor instructions and said multiplying means is arranged to generate a stream of multiplied out data and instructions comprising the multiplied data processor instructions for the data processor.

28. A data processor controller as defined in claim 21, wherein the first processor is arranged to generate data processor instructions in a compounded format and the multiplying means is arranged to separate out the compounded instructions into a non-compounded format.

29. A data processor controller as defined in claim 21, wherein the data processor is a Single Instruction stream operating on Multiple Data (SIMD) data processor.

30. A data processor controller as defined in claim 21, wherein the first processor is a microprocessor or a digital signal processor.

31. A data processor controller as defined in claim 21, wherein the data processor controller and the data processor are formed in a single silicon device.

32. A processor-controlled apparatus including a data processor controller as defined in claim 21.

33. A bandwidth multiplier for multiplying data processor instructions for controlling a data processor coupled to the multiplier, the bandwidth multiplier comprising:

input means for receiving data :processor instructions over a communications channel having a first data width; and multiplying means coupled to the input means for preparing and outputting instructions for the data processors, the multiplying means being arranged to multiply nested blocks of received data processor instructions to generate output instructions for the data processor, and to isolate the preparation of the output instructions from their output to the data processor, the output instructions having a second data width greater than the first data width;

wherein the input means includes a de-coupler for asynchronously de-coupling the multiplying means from the receipt of the data processor instructions, the multiplying means is arranged to repeat nested blocks of instructions asynchronously with the receipt of the data processing instructions from the instruction generating means and to prepare concurrently other types of data processing instructions for subsequent output to the data processor as said multiplied instructions, and the bandwidth multiplier comprises a data memory for storing the nested blocks of instructions, and repeat control logic means for retaining the nested blocks of instructions in the data memory and repeatedly sending them to the data processor.

34. A bandwidth multiplier as defined in claim 33, wherein the data processor instructions include instructions for controlling the operation of the multiplying means.

35. A bandwidth multiplier as defined in claim 33, wherein the multiplying means comprises instruction repetition means for repeating individual data processor instructions contained in the instructions received by the input means.

36. A bandwidth multiplier as defined in claim 34, wherein the multiplying means comprises instruction repetition means for repeating individual data processor instructions contained in the instructions received by the input means.

37. A bandwidth multiplier as defined in claim 36, wherein the instructions received by the input means contain instruction repetition control information, and the instruction repetition means is arranged to use the instruction repetition control information for repeating the individual data processor instructions.

38. A bandwidth multiplier as defined in claim 33, wherein the multiplying means comprises block repetition means for repeating a block or the nested blocks of data processor instructions.

39. A bandwidth multiplier as defined in claim 34, wherein the multiplying means comprises block repetition means for repeating a block or the nested blocks of data processor instructions.

40. A bandwidth multiplier as defined in claim 39, wherein the instructions received by the input means contain block repetition control information, and the block repetition means is arranged to use the block repetition control information for repeating the block or nested block of data processor instructions.

41. A bandwidth multiplier as defined in claim 38, wherein the instructions received by the input means contain address fields, and the block repetition means is arranged to change the address fields according to the repetition of the block instruction.

42. A bandwidth multiplier as defined in claim 33, wherein the input means is arranged to receive data processor instructions in a compounded format and the multiplying means is arranged to separate out the compounded instructions into a non-compounded format.

43. A bandwidth multiplier as defined in claim 33, further comprising instruction fetch means for decompressing compressed instructions received by the input means.

44. A bandwidth multiplier as defined in claim 43, wherein the input means is arranged to add a tag to the instructions that it receives, and the instruction fetch means is arranged to use the tag to decompress the instructions.

45. A bandwidth multiplier as defined in claim 33, wherein the de-coupler comprises a FIFO.

46. A bandwidth multiplier as defined in claim 33, and further comprising an output buffer for reading a result or status of the data processor and writing same to a controlling processor.

47. A bandwidth multiplier as defined in claim 33, wherein the input means is arranged to receive a stream of data and instructions comprising said data processor instructions and said multiplying means is arranged to generate a stream of multiplied out data and instructions comprising the multiplied data processor instructions for the data processor.

48. A processor-controlled apparatus including a bandwidth multiplier as defined in claim 33.

49. A method of issuing, preparing and providing data processing instructions for controlling a data processor, the method comprising the steps of:

issuing data processor instructions at a first rate;

reading the issued data processor instructions;

storing nested blocks of data processor instructions in a data memory, preparing data processing instructions for the data processor by multiplying nested blocks of data processor instructions;

writing the multiplied data processor instructions to the data processor at a second rate greater than the first rate;

isolating the preparing step from the writing step; and wherein the multiplying step comprises repeating nested blocks of data processing instructions, asynchronously with the reading step and preparing concurrently other types of data processing instructions for subsequent writing to the data processor; and the reading step comprises asynchronously de-coupling the multiplying step from the issuing step.

50. A method as defined in claim 49, wherein the multiplying step comprises increasing the bandwidth of the data processor instructions generated at the second rate from the bandwidth of the data processor instructions issued at the first rate.

51. A method as defined in claim 49, wherein the issuing step comprises compressing data processor instructions.

52. A method as defined in claim 49, wherein the multiplying step comprises decompressing data processor instructions.

53. A method as defined in claim 49, wherein the issuing step comprises generating data processor instructions in a compounded format and the reading step comprises separating out the compounded instructions into a non compounded format.

54. A method as defined in claim 49, wherein the issuing step comprises issuing instructions which include instructions for controlling the operation of the bandwidth multiplying means.

55. A processor-controlled apparatus including a bandwidth multiplier configured to operate in accordance with the method of claim 49.

* * * * *

UNITED STATES PATENT AND TRADEMARK OFFICE
CERTIFICATE OF CORRECTION

PATENT NO. : 6,625,722 B1
DATED : September 23, 2003
INVENTOR(S) : John Charles Lancaster It is certified that error appears in the above-identified patent and that said Letters Patent is hereby corrected as shown below:

Column 20,
Line 1, reads as "; processor instructions" should read -- processor instructions --.
Line 6, reads as "data processors," should read -- data processors --.

Column 21,
Line 30, reads as "memory," should read -- memory; --.

Column 22,
Line 24, reads as "non compounded" should read -- non-compounded --.

Signed and Sealed this

Third Day of February, 2004

JON W. DUDAS
*Acting Director of the United States Patent and Trademark Office*